(12) United States Patent
Shimoyama et al.

(10) Patent No.: US 9,105,120 B2
(45) Date of Patent: Aug. 11, 2015

(54) DISPLAY SYSTEM OF ELECTRONIC MANUAL

(75) Inventors: Eiichiro Shimoyama, Tokyo (JP); Tsukasa Saito, Tokyo (JP); Yasushi Sato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 12/920,375

(22) PCT Filed: Mar. 10, 2009

(86) PCT No.: PCT/JP2009/001063
§ 371 (c)(1),
(2), (4) Date: Aug. 31, 2010

(87) PCT Pub. No.: WO2009/113297
PCT Pub. Date: Sep. 17, 2009

(65) Prior Publication Data
US 2011/0035721 A1   Feb. 10, 2011

(30) Foreign Application Priority Data

Mar. 13, 2008  (JP) .................................. 2008-063727

(51) Int. Cl.
G06F 3/048   (2013.01)
G06T 11/00   (2006.01)
G06T 11/20   (2006.01)

(52) U.S. Cl.
CPC ............. *G06T 11/001* (2013.01); *G06T 11/206* (2013.01); *Y02T 10/82* (2013.01)

(58) Field of Classification Search
USPC .......................................... 715/853; 716/139
See application file for complete search history.

(56) References Cited

U.S. PATENT DOCUMENTS 6,606,731 B1 *   8/2003   Baum et al. .................... 716/103
2006/0123692 A1 *   6/2006   Beronja ............................ 43/61

(Continued)

FOREIGN PATENT DOCUMENTS

JP   09-097276   4/1997
JP   2000-035982   2/2000

(Continued)

OTHER PUBLICATIONS

The XCircuit Schematic Capture Tutorial, Dec. 23, 2005, sourceforge.net, http://web.archive.org/web/20051223152926/ http://xcircuit.sourceforge.net/tutorial/tutorial2.html.*

(Continued)

*Primary Examiner* — Matt Kim
*Assistant Examiner* — William Trapanese
(74) *Attorney, Agent, or Firm* — Squire Patton Boggs (US) LLP

(57) ABSTRACT

A display system of electronic manual which allows easy identification of wirings. The display system of electronic manual is provided with a storage device in which stored is an electronic manual provided with a wiring diagram described in a vector image description language and constituted so as to allow reading by a browser program. In response to user's selection of a component on the wiring diagram displayed on a display, a wiring display system highlights the selected component. In response to user's operation of selecting the highlight, the wiring display system highlights wirings extending from the selected component. Moreover, while the wiring is highlighted, in response to user's operation of selecting gray display, the wiring display system switches the elements other than the selected component and the wirings extending from the component on the wiring diagram displayed on the display to be displayed in weak gray.

5 Claims, 5 Drawing Sheets

(56) References Cited

U.S. PATENT DOCUMENTS

| | | | | |
|---|---|---|---|---|
| 2006/0282796 | A1* | 12/2006 | Nuno et al. | 715/853 |
| 2007/0032207 | A1* | 2/2007 | Shah | 455/111 |
| 2007/0300198 | A1* | 12/2007 | Chaplin et al. | 716/10 |

FOREIGN PATENT DOCUMENTS

| | | |
|---|---|---|
| JP | 2003-051031 | 2/2003 |
| JP | 2006-293701 | 10/2006 |
| WO | 2004/104864 | 12/2004 |

OTHER PUBLICATIONS

Agilent Technologies, Schematic Capture and Layout, Aug. 2005, http://cp.literature.agilent.com/litweb/pdf/ads2005a/pdf/usrguide.pdf*

* cited by examiner

DISPLAY SYSTEM OF ELECTRONIC MANUAL

TECHNICAL FIELD

The present invention relates to a display system for an electronic manual including an electric wiring diagram used for maintenance and failure diagnosis of an automobile.

BACKGROUND ART

Recently, as described in Japanese Patent Application Publication No. 2004-29932 for example, electronic data are produced for manuals such as an automobile maintenance manual, which allows a huge amount of documents to be relatively easily searched and browsed. The electronic data for manuals including wiring diagrams are produced to display the manuals on a monitor screen of an electronic control system used in the automobile, the manuals being sophisticated and complicated.

The utilization of this kind of wiring diagram frequently includes the following procedure. During the failure diagnosis for example, causes of a failure are estimated from a failure event, the portion of the system that relates to the failure cause is displayed on a monitor screen, and investigation work is sequentially performed based on a system configuration displayed on the monitor screen.

Conventionally, the electronic manual is made such that the wiring diagram is prepared on the basis of system functions and is displayed on the screen. The screen can efficiently be switched between different scenes wherein connectors and pins of the wiring diagram are linked to wiring diagram of another scene. The wiring diagram is color-displayed with wiring displayed by color corresponding to the color of the wiring cord used in the car.

However, irrespective of the efforts mentioned above, the arrangement of wirings and components has become complicated with complication of the wiring diagram. Therefore, the wiring and component arrangement can hardly be visually ascertained. Even if the wiring is displayed in colors, sophisticated wiring diagram includes wirings of similar colors, making it difficult to distinguish from each other.

For cases where the cause of a failure is hard to determine, patient investigation is needed to sequentially track the wiring from a failure point to ascertain a point of cause. The wiring diagram displayed on the basis of systems is not good enough to investigate a wiring extending over plural systems.

For the circuit diagram illustrating a system relating only to brakes for example, wiring of a system relating to fuel injection is not displayed. However, in an actual wiring of a car, power supply wiring and ground wiring are common to various systems, mutually affecting plural systems.

In one example, assuming that a phenomenon called surge breakage took place, a service staff would identify the failure point by checking the automobile and finding a broken component. However, in order to identify a cause of the failure of the component, the service staff needs to estimate the cause checking connections of the whole wiring diagram of the vehicle starting from the failure point. At this point, when display of the electronic manual wiring is on the basis of systems, the investigation work would take a long time.

In contrast, the whole circuit diagram can be displayed without separating into different system, which results in a wiring diagram that is complicated and includes a large amount of information. Investigation can hardly be performed with this type of diagram even if the whole wiring diagram is scrolled on the monitor screen.

DISCLOSURE OF THE INVENTION

In view of the foregoing, an object of the invention is to provide a display system for an electronic manual in which the wiring can easily be identified.

According to the invention, there is provided a display system for electronic manual. The display system includes a computer installed with a browser program, a display unit connected to the computer, and a storage device in which an electronic manual is stored. The electronic manual includes a wiring diagram described in terms of a vector image description language. The electronic manual can be browsed by the use of a browser program. The display system includes means for highlighting a component in response to selection by a user, the component being located on the wiring diagram that is displayed on the display unit by the use of a browser program. The display system further includes means, in response to selection by the user of highlighting, for highlighting the wiring extending from a selected component. The display system includes a gray display means for changing display of elements other than those selected components and wiring extending from the selected components to weak gray in response to selection by the user of gray display while certain wiring is highlighted.

According to an embodiment, the wiring of the wiring diagram is displayed in colors corresponding to colors of actual wiring, and only the wiring extending from the selected component is displayed in color corresponding to the color of the actual wiring when the gray display is selected.

According to an embodiment, the display system of electronic manual further includes manipulation means for displaying the selected component in the center of a screen of the display unit.

According to an embodiment, the wiring display system further includes manipulation means for scaling wirings, that is magnification and reduction the wiring diagram.

According to an embodiment, the wiring display system further includes manipulation means for displaying the component and the wiring on the basis of system functions, which can be selected for display.

According to the invention, as a component is selected from the electronic manual wiring diagram, the wiring directly connected to the component is highlighted, and display of elements other than the component and wiring is changed to weak gray. Therefore, the component and wiring that are selected on the screen are clearly displayed while other portions are displayed in gray, enabling recognition of relationship with other portions. This would help investigation of the wiring to determine cause of a failure can.

According to the invention, also in an electronic manual having a mode of scroll in which the screen is scrolled to display a desired point while a large-scale wiring diagram such as a whole wiring diagram or the wide range of wiring diagram of the automobile is partially displayed on the screen, the selected component and the wiring connected to the component can be clearly recognized in contrast with other parts of wiring.

In an embodiment of the invention, the wiring displayed on the screen is displayed in the same color as an actual wiring cord so that the correspondence to the actual wiring is easily made. At this point, only the wiring of interest is displayed in color while the whole wiring is displayed in weak gray so that the wiring can be traced based on color discrimination.

In an embodiment of the invention, a specific component may be moved to the center of the screen of the display unit. Thus, the location of the specific component may easily be recognized while the whole circuit diagram is displayed in a reduced scale, facilitating tracing of the wiring.

In an embodiment of the invention, the display can be made on the basis of system units such as a fuel injection system, a brake system, and a headlight system in a display of the whole circuit diagram so that the investigation may be performed in consideration of the whole wiring display.

BRIEF DESCRIPTION HE DRAWINGS

BEST MODE FOR CARRYING OUT THE INVENTION

Figure 1:
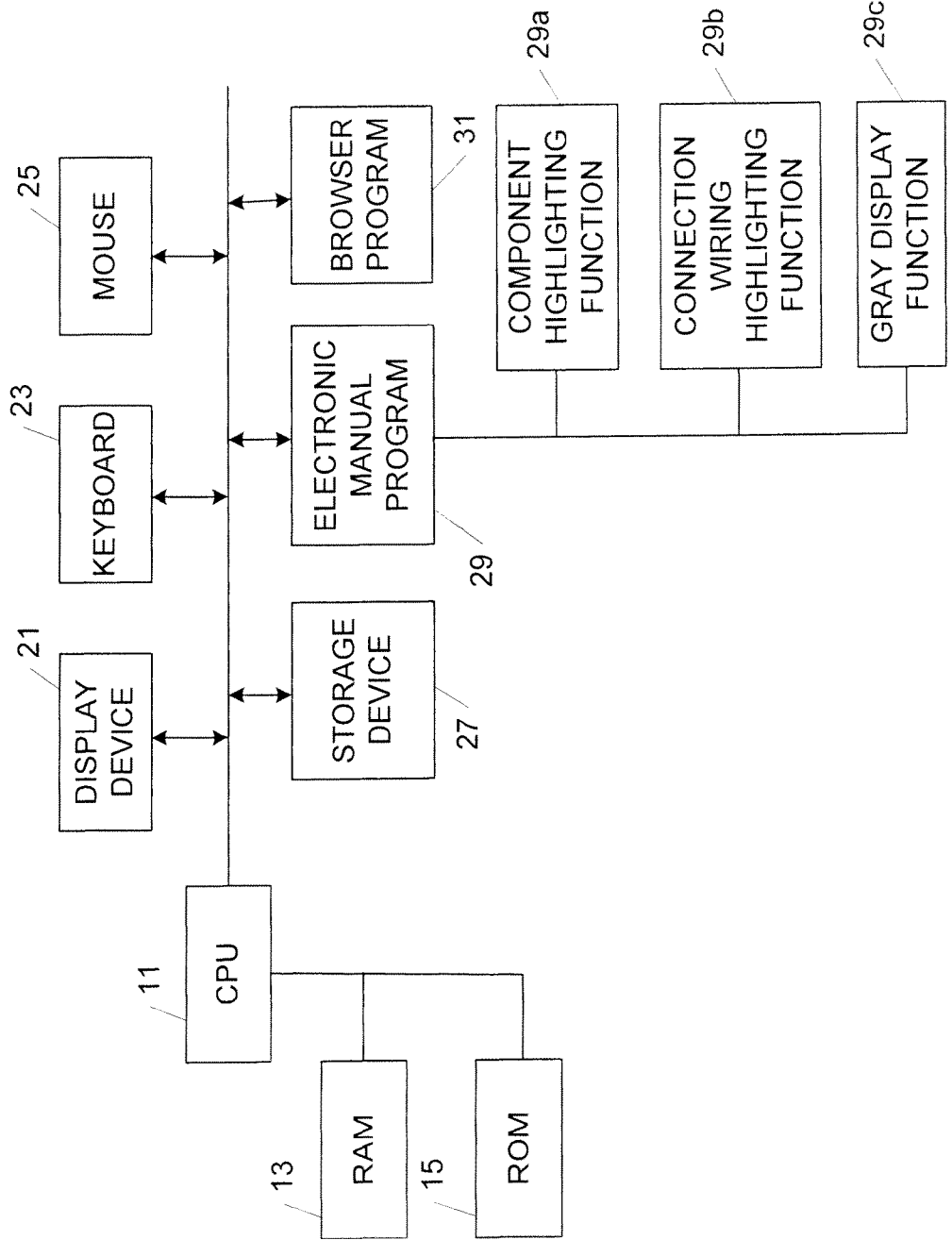
FIG. 1 is a functional block diagram of a display system of electronic manual according to an embodiment of the invention.

An embodiment of the invention will now be described with reference to the drawings. FIG. 1 is a functional block diagram illustrating a whole configuration of a wiring display system according to an embodiment of the invention. The wiring display system is realized by installing a program on a general-purpose computer such as a personal computer. FIG. 1 is a functional block diagram of the computer. A CPU 11 is a processor, and a RAM 13 is a random access memory that provides a working area to the processor and tentatively stores data and program therein. A ROM 15 is a read-only memory in which a basic computer program such as BIOS is stored.

The computer that realizes the wiring display system includes a large-capacity, nonvolatile storage device 27 in which application programs and data are stored. Typically the storage device 27 is a disc storage device. The computer includes a display unit 21, a keyboard 23, and a mouse 25.

An electronic manual program 29 is stored in the storage device 27. In an operating state of the wiring display system, because the electronic manual program works as one functional unit, the electronic manual program is expressed by a functional block in FIG. 1.

The electronic manual program is described in terms of a vector image description language. In the vector image, an image is not handled as a set of points but handled as a set of lines or planes so that optimum display can be made according to a viewing environment. Scalable Vector Graphics (abbreviated in SVG) can be cited as a typical example of the vector image description language. SVG is a description language for a XML-based two-dimensional vector image. An image file produced in terms of SVG can be used while embedded in another XML document. In the embodiment, a wiring image is produced in terms of SVG and embedded in an electronic manual described in terms of XHTML.

In the embodiment, a browser program 31 is a program that is used to browse the electronic manual including a wiring diagram produced in terms of SVG, and is used to display the electronic manual on the display unit. This program 31 is based on a general-purpose browser program such as Internet Explorer (trademark) of Microsoft Corporation, and SVG-View (trademark) is added, SVGView being a plug-in program for SVG provided by Adobe System.

The electronic manual program 29 includes a component highlighting function 29a, a connection wiring highlighting function 29b, and a gray display function 29c. The functions will be described below with reference to FIG. 2.

Figure 2:
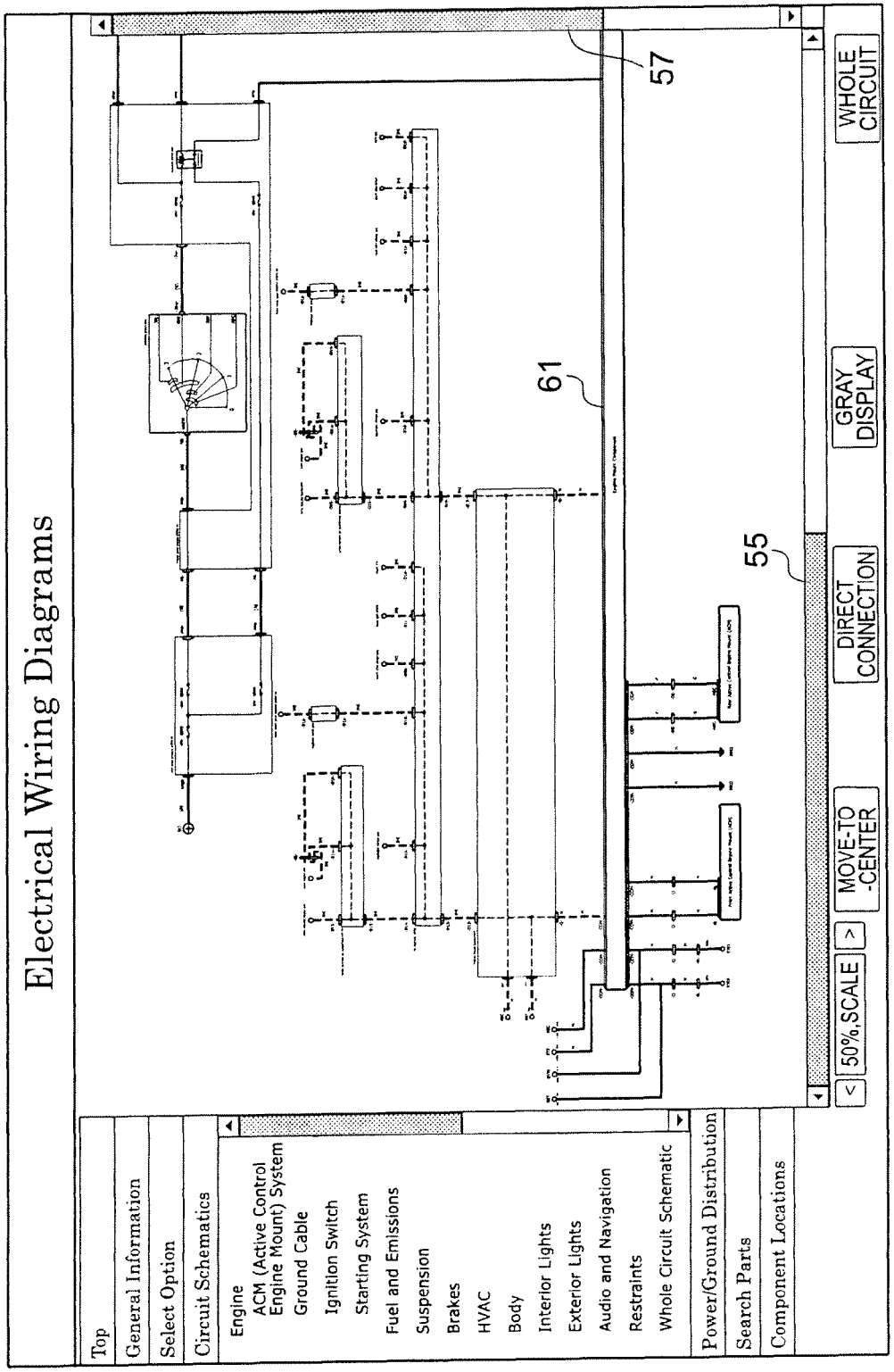
FIG. 2 is a view illustrating a display mode of a wiring diagram in an embodiment.

FIG. 2 illustrates a specific screen of the electronic manual of one embodiment. When the electronic manual program 29 (FIG. 1) is activated, the browser program 31 presents a top page of the manual on the display unit 21. The top page includes a design image in place of the circuit diagram illustrated in FIG. 2. A menu is provided at the left end of the top page including Top, General Information, Select Options, Circuit Schematics, Power/Ground, and Search Parts. If you place a cursor at Circuit Schematics and clicks it, a pull-down menu of a wiring diagram appears. The wiring diagram menu is segmented into plural large systems. That is, the wiring diagram menu includes Engine, Fuel and Emissions, Suspension, HVAC, Body, Interior Lights, and Whole Circuit Schematic.

When Engine is clicked, pull-down wiring menu appears, which relates to an engine sub-system. The pull down menu includes ACM (Active Control Engine Mount) system, Ground Cables, Ignition Switch, and Starting System as illustrated in FIG. 2.

When the cursor is placed on a character string of ACM system in the menu and is clicked, a wiring diagram as illustrated in the center of FIG. 2 appears. In the drawing, each wire is displayed in the same color as the wire in the actual vehicle. The screen includes a horizontal scroll bar 55 and a vertical scroll bar 57, and the screen can be scrolled to display a desired wiring point.

When the cursor is placed on a component ABC 61 and is clicked, the component 61 is highlighted. In the highlighted display of the embodiment, the frame of component 61 is displayed in red, and the frame blinks. This function is realized by component highlighting function 29a illustrated in FIG. 1.

When a Direct Connection button located below the screen is clicked, the screen changes to the mode illustrated in FIG. 3. The wires directly connected to the component 61 are highlighted in FIG. 3. In one embodiment, a red edge is added to the wires connected to component 61 such that the highlighted portion can be clearly distinguished from the other portions when monochrome print is done, and the red edge blinks in the screen. This function is realized by the connected wires highlighting function 29b of FIG. 1. The highlighted wires are the wires from a pin of component 61 to a pin of a destination, that is, wiring from a pin to another pin.

In the display mode illustrated in FIG. 3, the cursor is placed on a Gray Display button located below the screen and is clicked to switch the screen to the screen illustrated in FIG. 4. In FIG. 4, the components other than the component highlighted in FIG. 3 and the wires other than the wires highlighted in FIG. 3 are switched into presentation in weak gray. At the same time, the component and wires which are highlighted in FIG. 3 are now switched into regular non-highlighted presentation similar to that in FIG. 2. This function is realized by a gray display function illustrated in FIG. 1. Therefore, the user can clearly recognize the selected component 61 and the wires connected to component 61 viewing the other wirings in the gray background.

Figure 3:
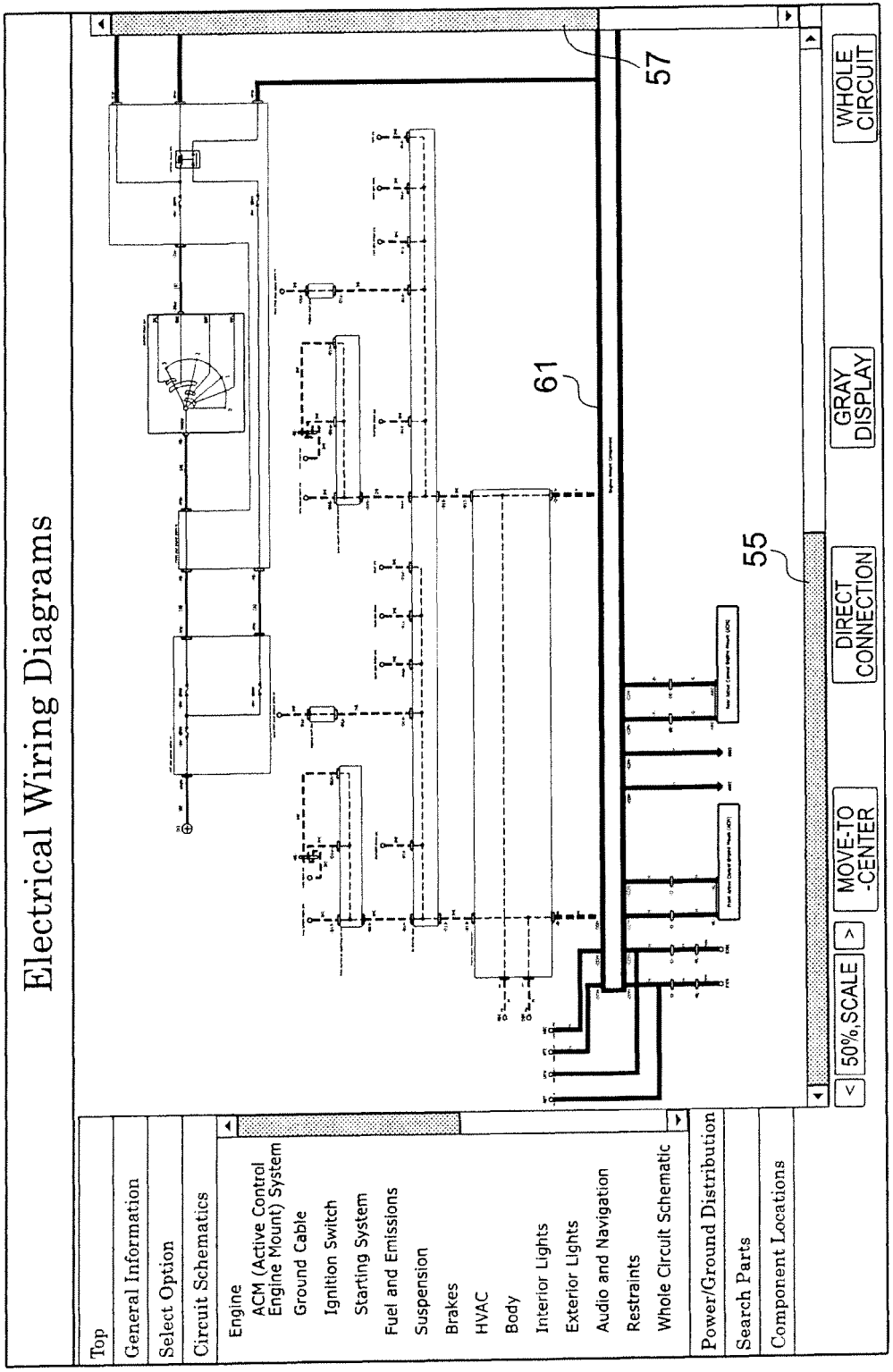
FIG. 3 is a view illustrating another display mode of the wiring diagram in an embodiment.
Figure 4:
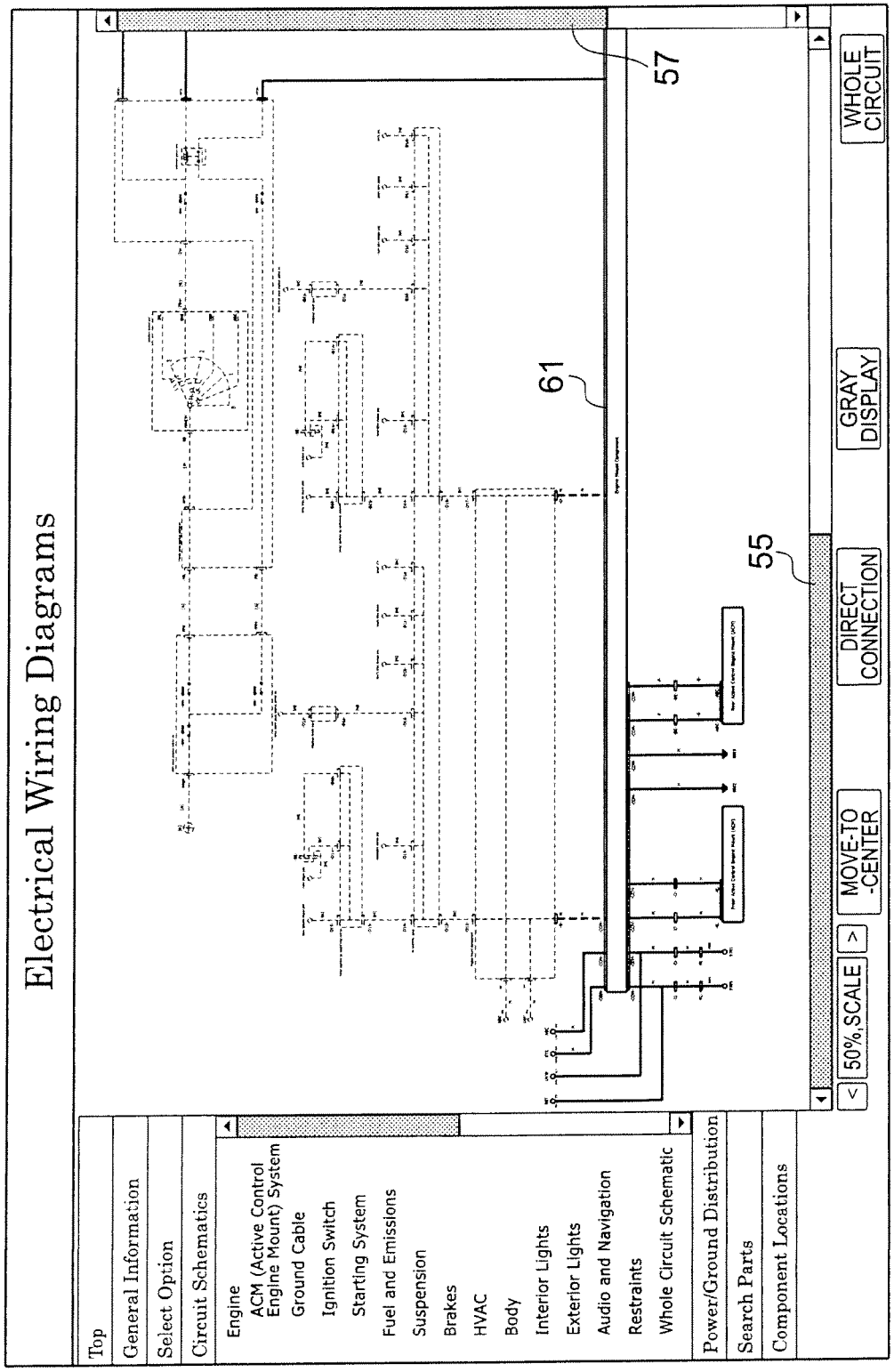
FIG. 4 is a view illustrating still another display mode of the wiring diagram in an embodiment.
Figure 5:
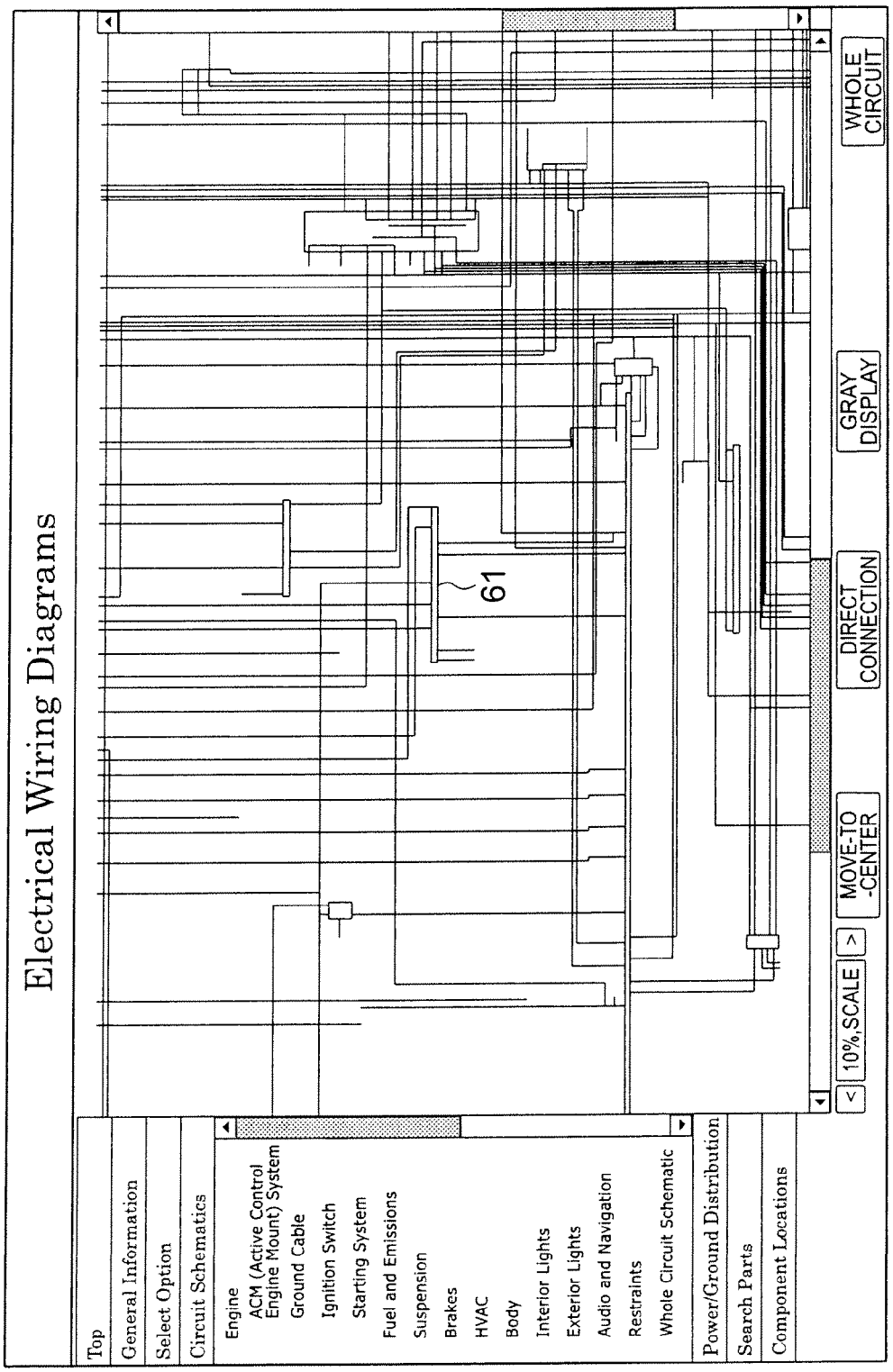
FIG. 5 is a view illustrating an example of a display mode of a whole circuit diagram.

When a "Whole Circuit" button is clicked while component 61 is selected in FIG. 3, the whole circuit diagram is displayed with component 61 disposed in the center of the screen and highlighted as illustrated in FIG. 5. With this condition, the gray display is implemented if the "Gray Display" button is clicked.

In such cases, as the whole circuit diagram is too large to be displayed in the screen of the display unit, in one embodiment, 10% reduction is used for implementing reduced presentation. The reduction scale can be changed using a scale selecting function.

The position of the selected component 61 in the screen may be moved using the scroll bars 55 and 57. When component 61 is selected and "Move-to-Center" button is clicked, component 61 is moved to appear in the center of the screen.

In the embodiment, the whole circuit diagram presentation is described in a sequence of selection of ACM system and implementation of whole circuit diagram. Alternatively, the whole circuit diagram may be presented by selecting "All Circuit Schematic" from the menu of Circuit Schematics.

Although the invention is described relative to specific embodiments by way of example, the present invention is not limited to such embodiments.

The invention claimed is:

1. A display system for an electronic manual of an automobile, comprising:
    a computer with a browser program;
    a display unit connected to the computer;
    a storage device storing the electronic manual, the electronic manual including a whole circuit diagram described in a vector image description language, the electronic manual being browsed using the browser program, wherein the whole circuit diagram covers a plurality of systems of an automobile that at least comprise an engine system, fuel and emissions system, and suspension system;
    wherein said display unit is configured to enable a user to scroll the whole circuit diagram in order to select a component in the whole circuit diagram;
    a component highlighting unit configured to highlight a component in response to user selection of the component in the whole circuit diagram that is illustrated in a display screen;
    a wiring highlighting unit configured to highlight one or more wirings connected directly to and extending from one or more pins of the selected component in response to user activation of a predetermined button illustrated in the display screen; and
    a gray display unit configured to change presentation of elements other than the selected component and the one or more wirings extending from the selected component into gray presentation that is weaker than presentation of the selected component and the one or more wirings in response to user activation of a button for gray display.

2. The display system according to claim 1, wherein the wires are presented in color corresponding to the color of actual wires, and when the gray display is implemented, only the one or more wirings extending from the selected component are presented in color corresponding to the color of the actual wires.

3. The display system according to claim 2, further comprising a manipulation unit configured to display the selected component at the center of the screen.

4. The display system according to claim 2, further comprising a scale selection unit configured to implement magnified or reduced presentation of the wiring diagram.

5. The display system according to claim 1, further comprising a sorting unit configured to display the components and the wirings on a basis of system functions.

* * * * *